(12) United States Patent
Benayahu et al.

(10) Patent No.: US 7,492,308 B2
(45) Date of Patent: Feb. 17, 2009

(54) THREAT DETECTION SYSTEM

(75) Inventors: Yair Benayahu, Camon (IL); Asher Vuskoboinik, Kiryat Bialik (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 18 days.

(21) Appl. No.: 11/624,225

(22) Filed: Jan. 18, 2007

(65) Prior Publication Data

US 2008/0191926 A1 Aug. 14, 2008

(30) Foreign Application Priority Data

Jan. 18, 2006 (IL) ..................... 173221

(51) Int. Cl.
*G01S 13/86* (2006.01)
*G01S 13/88* (2006.01)
*G01S 13/00* (2006.01)

(52) U.S. Cl. ............................. 342/52; 342/13; 342/14; 342/53; 342/55; 342/61; 342/62; 342/67; 342/175; 342/195; 89/1.11; 244/3.1

(58) Field of Classification Search ........... 244/3.1–3.3; 342/27, 28, 52–67, 175, 195, 13–20, 89, 342/90, 104–115, 118, 125–147, 157, 158, 342/450–465; 89/1.11, 37.01, 41.01, 41.02, 89/41.06, 41.07; 250/200, 201.1, 203.1, 250/203.2, 203.3, 203.6, 206, 214 R, 214.1, 250/336.1, 338.1, 349, 361 R, 363.01–363.03; 356/138, 139.04, 139.05, 140, 141.2, 141.5, 356/402, 416; 382/100, 103; 367/118, 128

See application file for complete search history.

(56) References Cited

U.S. PATENT DOCUMENTS 3,061,727 A * 10/1962 Roth et al. .................. 250/349
3,320,420 A * 5/1967 Paglee et al. ................... 342/53
3,940,607 A * 2/1976 Krider ....................... 356/141.5
3,982,713 A * 9/1976 Martin ........................ 244/3.1
3,992,708 A * 11/1976 Olson et al. .................... 342/52
4,925,129 A * 5/1990 Salkeld et al. .............. 244/3.11
5,053,622 A * 10/1991 Kessler ........................ 89/1.11
5,631,654 A * 5/1997 Karr ............................. 342/90
5,652,588 A * 7/1997 Miron ........................... 342/58
5,662,291 A * 9/1997 Sepp et al. ................. 244/3.13
5,796,474 A * 8/1998 Squire et al. ............. 250/203.6
5,798,942 A * 8/1998 Danchick et al. .............. 342/90
6,057,915 A * 5/2000 Squire et al. ........... 356/139.05
6,125,308 A * 9/2000 Hills et al. .................. 244/3.11
6,215,731 B1 * 4/2001 Smith .......................... 367/128
6,265,704 B1 * 7/2001 Livingston ............... 250/203.2

(Continued)

FOREIGN PATENT DOCUMENTS

DE 3941391 12/1989

(Continued)

*Primary Examiner*—Bernarr E Gregory
(74) *Attorney, Agent, or Firm*—Mark M. Friedman

(57) ABSTRACT

An optical detection system for detecting launch of an offensive projectile. The detection system includes an image detector array, an optical arrangement for focusing on to the image detector array, and a processing system associated with the image detector array. The processing system is configured to derive a series of frames from the image detector, to process the series of frames to identify a flash event and to generate and output that indicates a direction of the flash event.

18 Claims, 3 Drawing Sheets

U.S. PATENT DOCUMENTS

| | | | |
|---|---|---|---|
| 6,527,222 B1* | 3/2003 | Redano | 244/3.14 |
| 6,666,401 B1* | 12/2003 | Mardirossian | 244/3.11 |
| 6,677,571 B1* | 1/2004 | Clark et al. | 250/214.1 |
| 6,717,543 B2* | 4/2004 | Pappert et al. | 342/13 |
| 6,720,907 B1* | 4/2004 | Miron | 342/52 |
| 6,739,547 B2* | 5/2004 | Redano | 244/3.14 |
| 6,825,792 B1* | 11/2004 | Letovsky | 342/14 |
| 6,877,691 B2* | 4/2005 | DeFlumere et al. | 244/3.16 |
| 6,958,813 B1* | 10/2005 | Ahmadjian et al. | 356/416 |
| 7,046,187 B2* | 5/2006 | Fullerton et al. | 342/54 |
| 7,066,427 B2* | 6/2006 | Chang | 244/3.19 |
| 7,104,496 B2* | 9/2006 | Chang | 244/3.19 |
| 7,202,809 B1* | 4/2007 | Schade et al. | 342/67 |
| 7,205,520 B1* | 4/2007 | Busse et al. | 250/203.6 |
| 7,230,221 B2* | 6/2007 | Busse et al. | 250/203.6 |
| 7,248,210 B2* | 7/2007 | Bruce et al. | 342/175 |
| 7,292,711 B2* | 11/2007 | Kiraly et al. | 382/103 |
| 7,348,918 B2* | 3/2008 | Redano | 342/62 |
| 2006/0021498 A1* | 2/2006 | Moroz et al. | 89/41.06 |
| 2007/0012591 A1 | 1/2007 | Igarashi | |
| 2007/0125951 A1* | 6/2007 | Snider et al. | 250/363.03 |

FOREIGN PATENT DOCUMENTS

| | | |
|---|---|---|
| EP | 1580518 | 9/2005 |
| GB | 2280563 | 2/1995 |
| WO | WO 2004/003455 | 1/2004 |
| WO | WO2004/036138 A1 * | 4/2004 |
| WO | WO2006/134050 A1 * | 12/2006 |

* cited by examiner

THREAT DETECTION SYSTEM

FIELD AND BACKGROUND OF THE INVENTION

The present invention relates to threat detection systems and, in particular, it concerns a detection system for detecting rockets or missiles launched from short range towards a platform.

In the continuing conflict in Iraq, shoulder fired rocket propelled grenades (RPGs) were once again proven a potent weapon. RPGs have performed impressively in all post WWII conflicts, especially in Vietnam, Afghanistan and Chechnya. Designed specifically for close combat operations, this reliable, simple and affordable weapon poses a serious threat to even the heaviest tanks when used by determined fighters, in both urban and guerrilla warfare. Inexperienced RPG operators can engage a stationary target effectively from 150-300 meters, while experienced users could kill a target at up to 500 meters, and moving targets at 300 meters. In post war Iraq, RPGs have caused the death of over fifty percent of U.S. soldiers killed in action.

One approach for protecting tanks, armored vehicles, light vehicles and stationary platforms from incoming rocket propelled grenades ("RPG"s) or anti-tank missiles is the use of an active protection system. Active protection systems are composed of two subsystems: a detection system for detecting the incoming threat; and a countermeasure system for engaging the threat so as to neutralize the threat or at least reduce its efficacy. A range of countermeasure technologies have been used for active protection systems against RPGs and anti-tank missiles. Examples include: "soft-kill" technology such as direct infrared countermeasures (DIRCM); "hard-kill" technology such as the fragment ejection system of the Arena-E system (KBM, Russia); and airbag deflection systems.

The predominant choice for the detection technology of an active protection system is a panoramic radar system. It has been found, however, that for short range applications of less than 100 meters, panoramic radar becomes unreliable, failing to provide sufficient precision or warning time for reliably operating countermeasures. As an alternative, systems have been proposed employing bolometric imaging sensors sensitive in the 8-13 micron wavelength range to detect the launch flash of a threat. Bolometric imaging sensors, however, provide relatively low sensor resolution, requiring multiple sensors to cover a panoramic field of view. This fact, combined with the high unit cost of such sensors, renders such detection systems economically unviable for large scale installation on a wide range of platforms.

There is therefore a need for an optical threat detection system which would use readily available low-cost components to provide effective threat detection at ranges not reliably covered by radar-based detection systems. It would also be advantageous to combine such an optical system with a radar-based detection system to provide effective short and long range detection of offensive projectiles, and for actuating a countermeasure system.

SUMMARY OF THE INVENTION

The present invention is a detection system for detecting rockets or missiles launched from short range towards a platform.

According to the teachings of the present invention there is provided, an optical detection system for detecting launch of an offensive projectile, the detection system comprising: (a) an image detector array sensitive to radiation in at least one range of wavelengths of near-infrared, visible or near-ultraviolet radiation; (b) an optical arrangement for focusing on to the image detector array a substantially panoramic field of view; and (c) a processing system associated with the image detector array and configured: (i) to derive a series of frames from the image detector array at a frame rate of at least 30 frames per second; (ii) to process the series of frames to identify a flash event; and (iii) to generate an output indicative of a direction in which the flash event occurred.

According to a further feature of the present invention, the image detector array and the optical arrangement are configured such that the frames have an angular pixel resolution such that each pixel corresponds to no more than 5 milliradians.

According to a further feature of the present invention, the image detector array is integrally formed as part of a silicon chip.

According to a further feature of the present invention, the image detector array is selected from the group consisting of: a CCD detector and a CMOS detector, and most preferably, as a CMOS detector.

According to a further feature of the present invention, the processing system is further configured to determine whether the flash event satisfies at least one temporal flash signature criterion.

According to a further feature of the present invention, the optical arrangement includes a band-pass spectral filter for selectively focusing on to the image detector array incident radiation in a first band of wavelengths.

According to a further feature of the present invention, there is also provided a flash illumination arrangement for generating an illumination flash in at least the direction in which the flash event occurred, the illumination flash lying within the first band of wavelengths.

According to a further feature of the present invention, the optical arrangement is configured to focus on to the image detector array a substantially panoramic field of view having an elevation range of at least 20°.

According to a further feature of the present invention, the optical arrangement is configured to focus on to the image detector array a substantially panoramic field of view having an elevation range of at least 30°.

According to a further feature of the present invention, there is also provided at least one additional imaging arrangement associated with the processing system and spaced apart from the optical arrangement, the processing system being further configured to co-process data derived from the additional imaging arrangement and the frames from the image detector array to derive range information for the flash event.

According to a further feature of the present invention, the image detector array and the optical arrangement form part of an optical detection subsystem having a maximum effective detection range, the detection system further comprising a substantially panoramic radar arrangement deployed for detecting approaching offensive projectiles at a range greater than the maximum effective detection range of the optical detection subsystem.

There is also provided according to the teachings of the present invention, an active protection system comprising: (a) the aforementioned optical detection system; and (b) a countermeasure system responsive to detection of a flash event by the optical detection system to deploy at least one countermeasure for neutralizing or reducing the efficacy of the offensive projectile.

According to a further feature of the present invention, the countermeasure system includes a narrow-field-of-view gimbaled radar, the countermeasure system being configured to direct the gimbaled radar towards the direction in which the flash event occurred.

There is also provided according to the teachings of the present invention, a method for protecting a platform from offensive projectiles, the method comprising the steps of: (a) deploying an optical detection subsystem to detect flash events corresponding to the launch of offensive projectiles within a maximum effective detection range from the platform; (b) deploying a radar detection subsystem including a substantially panoramic radar arrangement to detect approaching offensive projectiles at a range greater than the maximum effective detection range of the optical detection subsystem; and (c) actuating at least one anti-projectile countermeasure responsively to each of the optical detection subsystem and the radar detection subsystem so as to neutralize or reduce the efficacy of an offensive projectile.

According to a further feature of the present invention, the optical detection subsystem includes a CCD image detector array.

According to a further feature of the present invention, the optical detector subsystem includes a CMOS image detector array.

According to a further feature of the present invention, the optical detection subsystem includes: (a) an image detector array selected from the group consisting of: a CCD detector and a CMOS detector; and (b) an optical arrangement for focusing on to the image detector array a substantially panoramic field of view.

There is also provided according to the teachings of the present invention, an optical detection system for detecting launch of an offensive projectile, the detection system comprising: (a) an image detector array selected from the group consisting of: a CCD detector and a CMOS detector; (b) an optical arrangement for focusing on to the image detector array a given field of view; and (c) a processing system associated with the image detector array and configured: (i) to derive a series of frames from the image detector array at a frame rate of at least 30 frames per second; (ii) to process the series of frames to identify a flash event; and (iii) to generate an output indicative of a direction in which the flash event occurred.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is a detection system for detecting rockets or missiles launched from short range towards a platform.

The principles and operation of detection systems according to the present invention may be better understood with reference to the drawings and the accompanying description.

Figure 1:
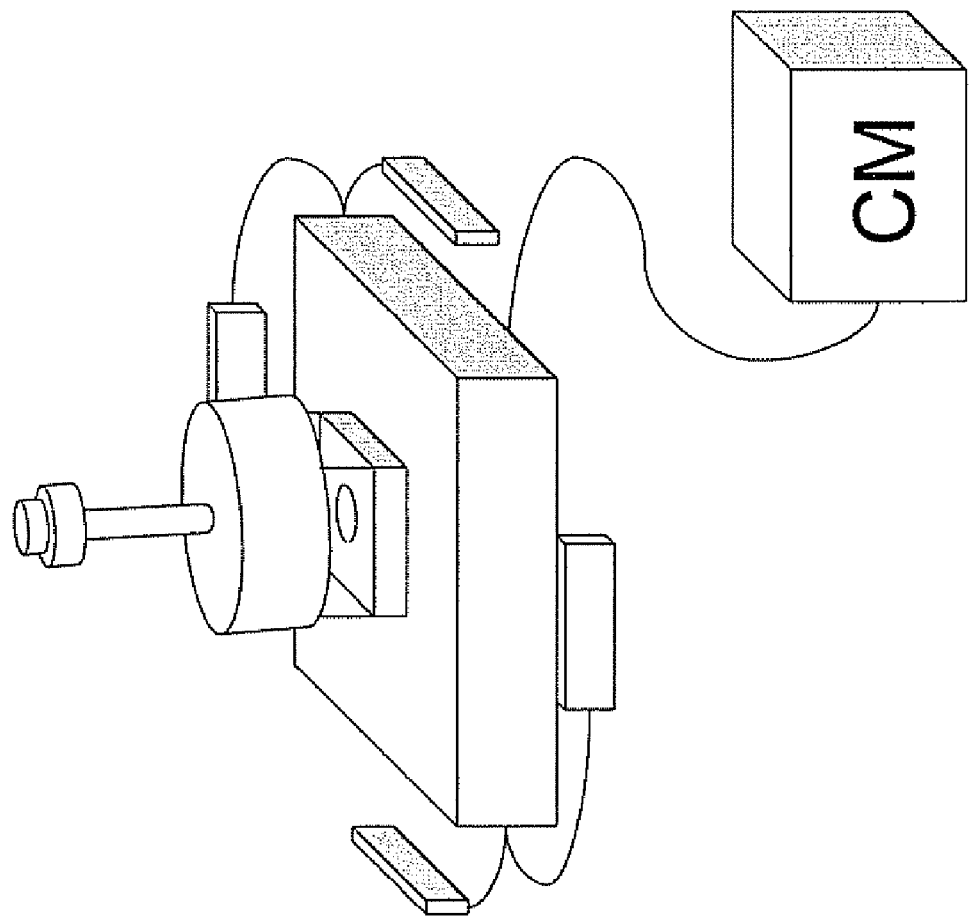
FIG. 1 is a schematic isometric view of the main components of an active protection system including an optical detection subsystem constructed and operative according to the teachings of the present invention.
Figure 2:
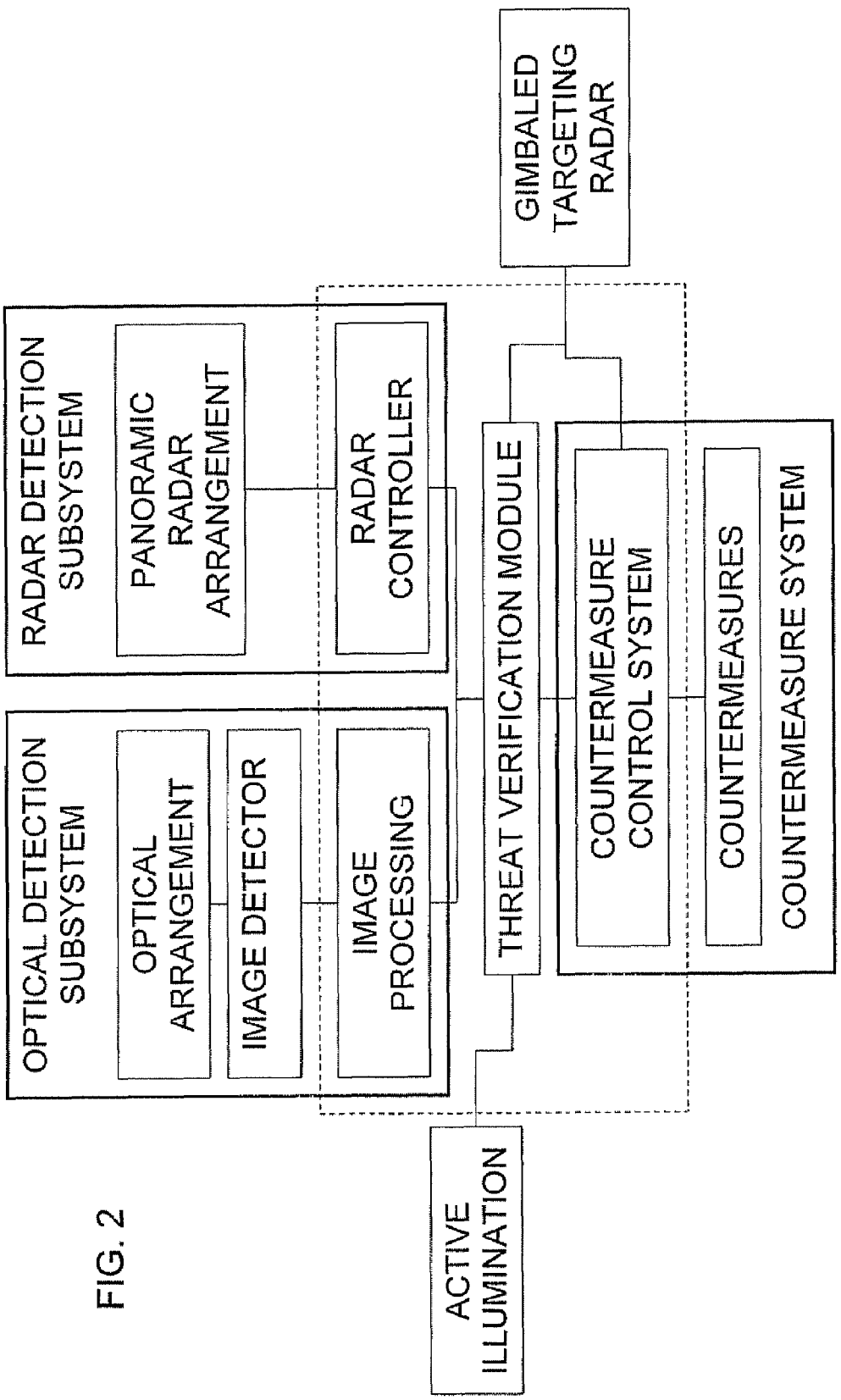
FIG. 2 is a block diagram of the active protection system of FIG. 1.

Referring now to the drawings, FIGS. 1 and 2 show generally an active protection system, generally designated 10, constructed and operative according to the teachings of the present invention, for protecting a platform from offensive projectiles. By way of introduction, referring to FIG. 2, the present invention relates primarily to an optical detection system 12 for detecting launch of offensive projectile which is believed to be patentable in its own right, but which may be used to advantage as a subsystem of active protection system 10. It should be noted that optical detection system 12 may be used as a free standing system, for example, for operating an audio alarm to warn crew members to jump from a vehicle or to dive to the floor. More preferably, however, optical detection system is used as an input to a countermeasure system 14, and most preferably, in synergistic combination with an additional radar detection subsystem 16 for monitoring ranges beyond the maximum effective range of the optical detection subsystem. For this reason, optical detection system 12 will be described herein in the non-exclusive but preferred context of active protection system 10.

Referring now to both FIGS. 1 and 2, in general terms, optical detection system 12 includes an image detector array 18 and an optical arrangement 20 for focusing on to image detector array 18 a field of view which is preferably substantially panoramic Optical detection system 12 also includes a processing system 22 associated with image detector array 18 and configured to implement an image processing module 24 effective: (i) to derive a series of frames from the image detector array at a frame rate of at least 30 frames per second; (ii) to process the series of frames to identify a flash event; and (iii) to generate an output indicative of a direction in which the flash event occurred.

It is a particular feature of most preferred implementations of the present invention that image detector array 18 is sensitive to radiation in at least one range of wavelengths of near-infrared, visible or near-ultraviolet radiation, i.e., at least one part of the electromagnetic spectrum in the range of wavelengths from about 0.25 microns up to about 1.1 microns. This allows use of an image detector array integrally formed as part of a silicon chip, and preferably selected from the group consisting of: a CCD detector and a CMOS detector, and most preferably, a CMOS detector. Contrary to the conventional teaching in the art which relies upon far-infrared imagery at wavelengths in the range from 3 microns and above, it has been found that these sensors, sensitive only to radiation in the near-infrared, visible or near-ultraviolet range, are effective for distinguishing flash events corresponding to launch of a projectile from a wide range of other background noise and "clutter" based upon flash signatures correlating the duration, size and/or intensity of the detected flash. The use of CCD or CMOS technology reduces the costs of the optical detection system compared to bolometric imaging sensor systems by up to two orders of magnitude. At the same time, the high pixel density and high pixel count available using the mature technology of CCD or CMOS detectors provides resolution sufficient for threat detection even when using panoramic optics.

Turning now to the features of optical detection system 12 in more detail, optical arrangement 20 may be implemented using any suitable optical arrangement which provides the desired panoramic field of view. The term "panoramic" is used in this context to refer to a substantially continuous field of view circumscribing the sensor. It should be noted that the system may tolerate slight obscurations or breaks in the continuity of the field of view, such as may be caused by wires or small structural elements extending vertically past the optical arrangement, so long as the obscured regions are sufficiently small to render chances of obscuration of a flash event acceptably low. In practical terms, obscurations significantly less than one degree, and which total not more than 3 degrees about the entire periphery, are typically considered a "substantially continuous panoramic field of view" for the purpose of this description.

With regard to the vertical extent of the field of view defined by the optical arrangement, optical arrangement 20 is preferably configured to focus on to image detector array 18 a field of view having an elevation range of at least 20°, and more preferably at least 30°. In practice, larger angles of 50°-80° may be achieved.

By way of one non-limiting example, a suitable optical arrangement is commercially available in an omni-directional reconnaissance system marketed under the name "ODR"™ by O.D.F. Optronics Ltd. (Tel Aviv, Israel). The "ODR" system employs an optical arrangement producing a 360° horizontal field of view with a vertical range of 55°. The device has a cylindrical form with a diameter of 90 millimeters and a height of 500 millimeters, including the image detector array.

Image detector array 18 is preferably a standard mass-produced sensor chip based on silicon manufacturing techniques, where the sensor is integrally formed as part of a silicon chip. My way of a non-limiting example, image sensor chips used in consumer digital cameras are suitable for implementing certain embodiments of the present invention. These chips frequently reach pixel counts of 5 or more "megapixels" within a sensor area of less than 10 square centimeters. The pixel count is preferably chosen as a function of the angular extent of the field of view and an intended maximum effective detection range of the optical detection system to ensure that the resolution is sufficient to detect launch flashes. In a non-limiting preferred case, image detector array 18 and optical arrangement 20 are configured such that each pixel corresponds to no more than 5 milliradians. This means that each pixel corresponds to a width of about half a meter at a range of 100 meters, thereby ensuring effective detection of the launch signature of an RPG which is typically about 1 meter across.

Optionally, the sensor chip may be a monochrome sensor in which all pixels have a similar sensitivity profile as a function of wavelength. In certain particularly preferred implementations, a "slot filter" (not shown) selectively allowing transmission of a narrow pass-band of wavelengths, typically in the near infrared range (i.e., for some part of the wavelength range from 0.75 microns to 1.1 microns), is associated with image detector array 18 of optical arrangement 20 so as to shield the sensor from a large proportion of the background solar and other radiation.

Image processing module 24 preferably employs various criteria to assess whether an identified flash event is likely to be a launch event. These criteria typically include determining whether the flash event satisfies at least one temporal flash signature criterion. For example, an RPG typically exhibits an initial flash during the launch of about 15 milliseconds followed by dead time of about 150 milliseconds before the main rocket engine ignites. Thus, at frame rates of 30-60 Hz, the initial flash would be expected to fall within a single frame, or at most across two adjacent frames. A longer "flash" event is likely to be the result of solar clutter, such as the glint of a moving window or the like.

Other criteria which may be used to assess the likelihood of a flash event being a launch event include assessment of the radiation intensity compared to predefined criteria. Quantitative assessment of the flash intensity requires that the pixels sensing the flash do not reach saturation. The aforementioned notched pass-band filter is helpful for this purpose. Estimation of an absolute value of the flash intensity also requires estimation of a range to the flash location, which may be available according from one of various sources, including but not limited to: a real-time digital terrain map in combination with the direction of regard to the flash location; a radar generated terrain map; use of a rapid-response gimbaled laser range finder to measure the range in the direction towards the flash; use of a gimbaled targeting radar directed towards the flash; or triangulation based upon sensing from more than one optical sensor system, as will be described below.

In the absence of range data, the measured intensity may be correlated to the spatial extent of the flash (e.g., number of pixels over which it is spread) to verify that the spatial spread and the measured intensity are both suited to a launch flash at similar ranges.

In addition to the aforementioned image processing techniques for identifying launch flash events, according to certain preferred embodiments of the present invention, processing system 22 further implements a threat verification module 26 which obtains supplementary information from one or more source to verify the presence of an aggressive projectile. Modes of operation of verification module 26 may include any one, or combination, of the following.

According to a first verification option, system 10 is provided with an active illumination device 28 deployed for illuminating the projectile in flight, thereby rending the projectile visible via optical detection system 12 in at least selected frames subsequent to the initial launch flash. Active illumination device 28 may be any suitable illumination device for generating radiation at wavelengths detected by optical detection system 12. In certain cases, it is preferably to use non-visible illumination, typically in the near infrared, to avoid rendering the platform more visible to an assailant, although visible illumination may also be used. Most preferably, the illumination wavelength is coordinated with the aforementioned pass-band filter option with the pass-band centered narrowly around the illumination wavelength in order to increase the signal to noise ratio of the illumination and allow relatively low-power illumination. In this case, an array of light emitting diodes (LEDs) may be used to provide the illumination. The illumination may be directional or may be omni-directional such as a stroboscopic flash-bulb. In a further preferred option, a fixed arrangement of LEDs arrayed on directional panels and selectively actuated may provide directional illumination without requiring a gimbal mechanism.

Where active protection system 10 includes another detection subsystem such as radar detection subsystem 16, a further aspect of threat verification module 26 is preferably correlating of threat warning outputs from both detection subsystems Particularly for ranges towards the upper end of the maximum effective range of the optical detection subsystem, there is expected to be some degree of overlap between operation of the detection subsystems which provides further verification of the event of a real projectile launch.

According to a further aspect of threat verification module 26, particularly where countermeasure system 14 includes a gimbaled targeting radar 30, initiation of operation of countermeasure system 14 includes acquiring the projectile using the targeting radar 30. This also provides verification of the existence of an attacking projectile.

Turning now to the remaining features of the active protection system as illustrated in FIG. 2, radar detection subsystem 16 is typically implemented in a generally conventional manner, as is known in the art. Specifically, radar detection subsystem preferably includes a panoramic radar arrangement 32, typically made up of a number of flat panel radar sensors (34*a*, 34*b*, 34*c*, 34*d* in FIG. 1) deployed around the platform so as to provide substantially continuous panoramic coverage. Operation of the radar arrangement and analysis of its output is performed by a radar controller 36 which may optionally be integrated as part of processing unit 22.

Turning now to countermeasure system 14, this includes a countermeasures 38 which may be any presently known or as-yet-not-developed system of countermeasures, including but not limited to, the "hard kill", "soft kill" and deflective systems mentioned above. Countermeasures 38 are typically operated by a control system 40 which may optionally be integrated as part of processing unit 22.

Figure 3:
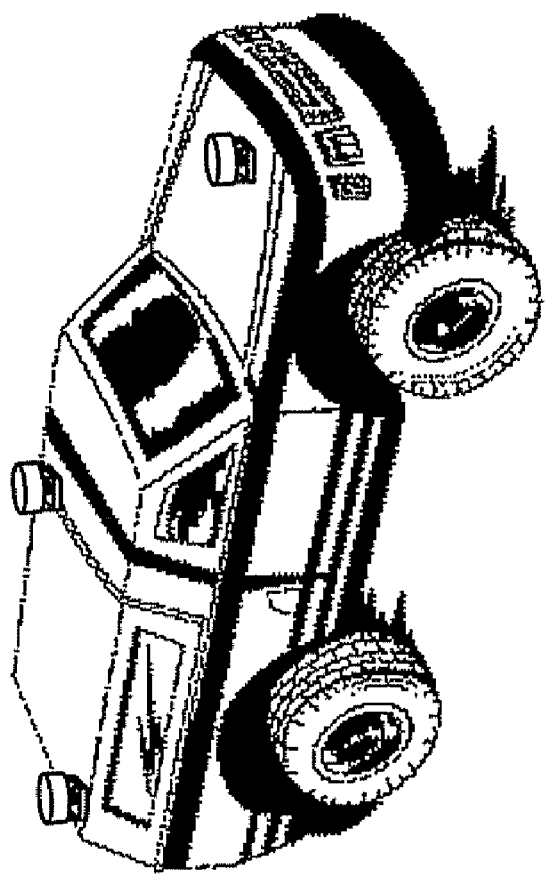
FIG. 3 is a schematic isometric view of a vehicle fitted with a plurality of optical detectors according to a further aspect of the present invention.

Turning now to FIG. 3, there is illustrated a further preferred option according to one aspect of the present invention in which at least two imaging arrangements 18, 20, associated with the processing system (not shown), are spaced apart on a platform 42 to be protected. In this case, the processing system is preferably configured to co-process data derived from the plural imaging arrangements to derive range information for the flash event. This range information may be used in the flash intensity calculation as mentioned above. Furthermore, the simultaneous monitoring by two or more optical arrangements provides further robustness against false alarms. It should be noted that the additional imaging arrangements need not all be panoramic arrangements. Particularly, depending on the structure of the platform to be protected, it may in some cases be preferably to provide some direction image sensor arrangements covering smaller angles (for example a 90° quadrant) from different vantage points on the vehicle.

The operation of active protection system 10 will now be clear. Specifically, both optical detection subsystem 12 and radar detection subsystem 14 preferably monitor for attacking projectiles continuously. In the event that either detection subsystem detects an incoming threat, and after suitable threat verification where available, countermeasure system 14 is actuated so as to neutralize or reduce the efficacy of an offensive projectile.

It will be appreciated that the above descriptions are intended only to serve as examples, and that many other embodiments are possible within the scope of the present invention as defined in the appended claims.

What is claimed is:

1. A threat detection system for use in protecting a platform from offensive projectiles, the threat detection system comprising:
    an optical detection subsystem for detecting launch of an offensive projectile, said optical detection subsystem including:
        (a) an image detector array sensitive to radiation in at least one range of wavelengths within the spectrum from near-infrared to near-ultraviolet radiation;
        (b) an optical arrangement for focusing on to said image detector array a substantially continuous field of view circumscribing said optical arrangement; and
        (c) a processing system associated with said image detector array and configured:
            (i) to derive a series of frames from said image detector array at a frame rate of at least 30 frames per second;
            (ii) to process said series of frames to identify a flash event; and
            (iii) to generate an output indicative of a direction in which the flash event occurred,
    a radar detection subsystem including a radar arrangement configured to detect approaching offensive projectiles from a range of directions substantially circumscribing the platform, and
    a threat verification module configured to verify the existence of an offensive projectile based upon data from both said optical detection subsystem and said radar detection subsystem.

2. The threat detection system of claim 1, wherein said image detector array and said optical arrangement are configured such that said frames have an angular pixel resolution such that each pixel corresponds to no more than 5 milliradians.

3. The threat detection system of claim 1, wherein said image detector array is integrally formed as part of a silicon chip.

4. The threat detection system of claim 1, wherein said image detector array is selected from the group consisting of: a CCD detector and a CMOS detector.

5. The threat detection system of claim 1, wherein said image detector array is implemented as a CMOS detector.

6. The threat detection system of claim 1, wherein said processing system is further configured to determine whether said flash event satisfies at least one temporal flash signature criterion.

7. The threat detection system of claim 1, wherein said optical arrangement includes a band-pass spectral filter for selectively focusing on to said image detector array incident radiation in a first band of wavelengths.

8. The threat detection system of claim 7, further comprising a flash illumination arrangement for generating an illumination flash in at least the direction in which the flash event occurred, said illumination flash lying within said first band of wavelengths.

9. The threat detection system of claim 1, wherein said optical arrangement is configured to focus on to said image detector array a substantially continuous field of view circumscribing said optical arrangement and having an elevation range of at least 20°.

10. The threat detection system of claim 1, wherein said optical arrangement is configured to focus on to said image detector array a substantially continuous field of view circumscribing said optical arrangement and having an elevation range of at least 30°.

11. The threat detection system of claim 1, further comprising at least one additional imaging arrangement associated with said processing system and spaced apart from said optical arrangement, said processing system being further configured to co-process data derived from said additional imaging arrangement and said frames from said image detector array to derive range information for the flash event.

12. An active protection system comprising:
    (a) the threat detection system of claim 1; and
    (b) a countermeasure system responsive to said threat verification module to deploy at least one countermeasure for neutralizing or reducing the efficacy of the offensive projectile.

13. The active protection system of claim 12, wherein said countermeasure system includes a narrow-field-of-view gimbaled radar, said countermeasure system being configured to direct said gimbaled radar towards said direction in which the flash event occurred.

14. A method for protecting a platform from offensive projectiles, the method comprising the steps of:
    (a) deploying an optical detection subsystem to detect flash events corresponding to the launch of offensive projectiles;

(b) deploying a radar detection subsystem including a substantially panoramic radar arrangement to detect approaching offensive projectiles from a range of directions substantially circumscribing the platform;

(c) verifying the existence of an offensive projectile based upon data from both said optical detection subsystem and said radar detection subsystem; and (d) on verification of the existence of an offensive projectile, actuating at least one anti-projectile countermeasure so as to neutralize or reduce the efficacy of the offensive projectile.

15. The method of claim 14, wherein said optical detection subsystem includes a CCD image detector array.

16. The method of claim 14, wherein said optical detector subsystem includes a CMOS image detector array.

17. The method of claim 14, wherein said optical detection subsystem includes:

(a) an image detector array selected from the group consisting of: a CCD detector and a CMOS detector; and (b) an optical arrangement for focusing on to said image detector array a substantially continuous field of view circumscribing said optical arrangement.

18. An optical detection system for detecting launch of an offensive projectile, the detection system comprising:

(a) an image detector array selected from the group consisting of: a CCD detector and a CMOS detector;

(b) an optical arrangement for focusing on to said image detector array a given field of view, said optical arrangement including a band-pass spectral filter for selectively focusing on to said image detector array incident radiation in a first band of wavelengths;

(c) a processing system associated with said image detector array and configured:

(i) to derive a series of frames from said image detector array at a frame rate of at least 30 frames per second;

(ii) to process said series of frames to identify a flash event; and (iii) to generate an output indicative of a direction in which the flash event occurred; and (iv) a flash illumination arrangement for generating an illumination flash in at least the direction in which the flash event occurred, said illumination flash lying within said first band of wavelengths.

* * * * *